(12) United States Patent
Schwindt

(10) Patent No.: US 8,989,984 B2
(45) Date of Patent: Mar. 24, 2015

(54) METHOD TO SHUT OFF ADAPTIVE CRUISE CONTROL WHEN THE UPHILL GRADIENT IS TOO STEEP

(71) Applicant: Robert Bosch GmbH, Stuttgart (DE)

(72) Inventor: Oliver F. Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 13/834,974

(22) Filed: Mar. 15, 2013

(65) Prior Publication Data

US 2014/0100754 A1 Apr. 10, 2014

Related U.S. Application Data

(60) Provisional application No. 61/709,691, filed on Oct. 4, 2012.

(51) Int. Cl.
| | |
|---|---|
| *B60T 8/32* | (2006.01) |
| *B60K 31/00* | (2006.01) |
| *B60W 30/14* | (2006.01) |
| *B60W 30/18* | (2012.01) |
| *B60W 40/076* | (2012.01) |

(52) U.S. Cl.
CPC ............... *B60K 31/00* (2013.01); *B60W 30/14* (2013.01); *B60W 30/18027* (2013.01); *B60W 40/076* (2013.01); *B60W 2510/0657* (2013.01); *B60W 2510/105* (2013.01); *B60W 2520/105* (2013.01); *B60W 2520/28* (2013.01); *B60W 2530/10* (2013.01); *B60W 2530/20* (2013.01); *B60W 2550/142* (2013.01)
USPC .......................................... 701/93

(58) Field of Classification Search
CPC ....................................................... B60T 8/32
USPC .......................................... 701/51, 68, 93–96
See application file for complete search history.

(56) References Cited

U.S. PATENT DOCUMENTS

| | | | |
|---|---|---|---|
| 5,630,772 A * | 5/1997 | Tsukamoto et al. ............ | 477/95 |
| 6,941,215 B2 | 9/2005 | Hellmann et al. | |
| 2009/0062071 A1* | 3/2009 | Cring ............................ | 477/174 |
| 2011/0282558 A1 | 11/2011 | Park | |

FOREIGN PATENT DOCUMENTS

| | | | | |
|---|---|---|---|---|
| DE | 102010001045 | * | 7/2011 | ............ B60W 30/18 |
| EP | 0681123 | | 11/1995 | |
| EP | 1529675 | | 5/2005 | |
| JP | 2008265602 | | 11/2008 | |
| KR | 20030085731 | | 11/2003 | |
| KR | 20040015564 | | 2/2004 | |
| KR | 100795619 | | 7/2008 | |

OTHER PUBLICATIONS

International Search Report and Written Opinion for Application No. PCT/US2013/063369 dated Dec. 19, 2013 (14 pages).

* cited by examiner

*Primary Examiner* — Kim T Nguyen
(74) *Attorney, Agent, or Firm* — Michael Best & Friedrich LLP

(57) ABSTRACT

A method of controlling an adaptive cruise control (ACC) system of a vehicle. The method including determining a torque of an engine of the vehicle, determining a torque of a transmission of the vehicle, calculating an idle force of the vehicle, obtaining a maximum tolerable gradient, obtaining an actual gradient of a surface the vehicle is on, and turning off the adaptive cruise control when the actual gradient exceeds the maximum tolerable gradient.

15 Claims, 2 Drawing Sheets

METHOD TO SHUT OFF ADAPTIVE CRUISE CONTROL WHEN THE UPHILL GRADIENT IS TOO STEEP

RELATED APPLICATION

The present patent application claims the benefit of prior filed co-pending U.S. Provisional Patent Application No. 61/709,691, filed on Oct. 4, 2012, the entire content of which is hereby incorporated by reference.

BACKGROUND

Embodiments of the invention relate to adaptive cruise control (ACC). More specifically, embodiments of the invention relate to controlling an ACC by determining when there is a possibility of vehicle rollback.

Some ACCs stay active until the vehicle speed is zero. ACCs that "brake down to zero speed" use wheel direction sensors to determine whether the vehicle is stopped or do not allow a reacceleration of the vehicle once a deceleration-to-stop command has been issued. The reason that the ACC systems do not allow a re-acceleration once the vehicle has stopped (or is in the process of stopping) is because the vehicle may roll backwards on an uphill start. In particular, the unknown weight of the vehicle (e.g., when pulling a trailer), may lead to an incorrect estimation of the engine torque required to make the vehicle go forward. The determination of the required torque may also be complicated by gear selection, because the gear that the transmission is in influences the amount of torque required. Gear selection can be influence by a number of factors including traction control, a "snow mode" function, and other factors in which it may be desirable to start the vehicle from a standstill at higher gears.

SUMMARY

In one embodiment, the invention provides a method of controlling an adaptive cruise control (ACC) system of a vehicle. The method including determining a torque of an engine of the vehicle, determining a torque-ratio of a transmission of the vehicle, calculating an idle force of the vehicle, obtaining a maximum tolerable gradient, obtaining an actual gradient of a surface the vehicle is on, and turning off the adaptive cruise control when the actual gradient exceeds the maximum tolerable gradient.

In another embodiment the invention provides a vehicle. The vehicle includes an engine, a transmission driven by the engine, and an engine control unit (ECU) including an adaptive cruise control (ACC). The ACC is configured to determine a torque of the engine, determine a torque-ratio of the transmission, calculate an idle force of the vehicle, obtain a maximum tolerable gradient, obtain an actual gradient of a surface the vehicle is on, and turn off the ACC when the actual gradient exceeds the maximum tolerable gradient.

Other aspects of the invention will become apparent by consideration of the detailed description and accompanying drawings.

DETAILED DESCRIPTION

Figure 1:
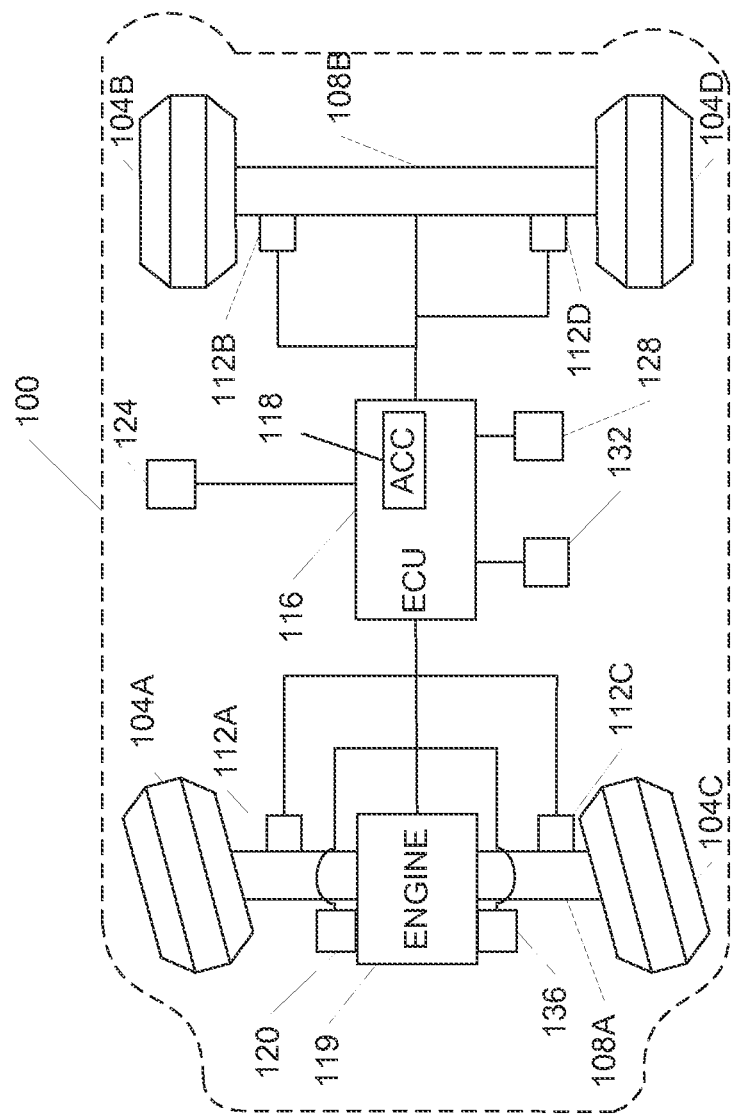
FIG. 1 is a schematic diagram of a vehicle

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention provides a method to determine a point where a vehicle could roll backwards. The point is then used to deactivate or shut the ACC off, such that it will not reaccelerate, when the hill is too steep. In particular, if the vehicle with ACC Stop and Go (or any ACC variant that remains active until zero speed) is not fitted with wheel-direction sensors, then confusion by the ACC system about a hill gradient may lead to a rollback that may not be self-recovering. This is because, without wheel-direction sensors, there is no quick and easy way of determining the direction of travel of the vehicle.

Powertrains are designed such that, on flat ground, when the driver lets go of the acceleration pedal the vehicle moves forward slowly. In a vehicle with an automatic transmission, the force that the engine is executing at standstill, which needs to be held back by the brake system to prevent movement, is calculated using $$F\_idle = EngineTorque * transmissionTorqueRatio / Tireradius \quad (1)$$

where EngineTorque is the torque that the engine is producing during idle, the transmission ratio is the torque that is being converted by the transmission (including rear axle), and Tireradius is the radius of the mounted tires.

Note that the torque-ratio of the transmission, and not the speed ratio, is used. For example, for a vehicle with an engine torque during idling of 30 Nm, a transmission ratio of 24, and a tire radius is 0.36 m, the forward force during standstill is 2000 N. The vehicle will move forward as long as the uphill gradient does not push the vehicle backward with a higher force.

An uphill gradient pushes the vehicle backwards by $$F\_hill = hillGradient * g * vehicleMass \quad (2)$$

The maximum hill gradient is found by solving for the hillgradient, using the idle force balancing the hill force. So, hillGradient=F_idle/g/vehicleMass. Using the example above, the hillGradient=10% for a 2000 kg vehicle.

A difficulty is that the vehicleMass is not known precisely. A conservative estimate uses the Gross Combined Vehicle Weight (GCVW). This, in general, reduces the maximum hill gradient by a factor of 2. For the above example, a GCVW of 4000 kg gives a maximum hillGradient of 5%.

Alternatively, an assumption about the hill gradient which leads to a rollback, can be made for a hill gradient for which a significant rollback occurs. Thus:

$$F\_hill = F\_idle + mass\_GCVW * a\_tolerableRollback \quad (3)$$

In the above example, if a tolerable rollback acceleration, where the ACC system will not confuse a rollback, or the driver can easily control the situation (i.e., has sufficient time to step on the brakes), is assumed to be 0.3 m/s2, a maximum allowable gradient would be 8%. The maximum tolerable acceleration may be adjusted from the example provided based on vehicle characteristics such as vehicle weight, brake system response time, and other factors. As is discussed below, in certain embodiments the chosen or predetermined maximum tolerable rollback is programmed in memory.

The gradient of a hill can be measured by calculating the difference between an acceleration calculated by the derivative of the wheel speeds and a longitudinal acceleration sensor fitted in the vehicle.

The values required to calculate the maximum allowable gradient are all values that are known in the vehicle specifications (e.g., vehicle mass or GCVW, tire size) or are available on an interface provided to the ACC (e.g., via a CAN-bus) such as, vehicle acceleration information (e.g., via wheel speeds), longitudinal acceleration sensor information, currently executed engine torque, transmission torque ratio over the powertrain. The idle torque can either be read in real-time or it can be coded into the ECU as a look-up value, since it is the same for a given engine during idling. The transmission torque ratio is dependent on the selected gear. If a real-time value cannot be used, the torque-converter will behave in a similar way, regardless of the selected gear, and therefore the conversion ratio can be the torque-converter ratio during idling multiplied by the gear ratio of the selected gear or the entire idling ratio for each gear individually.

An additional variant would be to use different percentage cutoff values dependent on the selected gear. This is in principle the same as the method described above since the idle behavior of the engine and transmission is only gear-dependent (all other effects other than vehicle mass are negligible or constant). The values can either be calculated by the listed equations or by calibration.

The shut-off method described above is based on the physics of idle-torque behavior on uphill situations, and includes real-time dependencies of the vehicle (selected gear), constant-dependencies (idle-torque, torque-converter idle behavior), highest allowed mass (GCVW), and a definition of a tolerable rollback acceleration.

With an ideal ACC Stop and Go system, there should not be confusion that leads to a rollback situation. However, for systems without wheel direction sensors, there is no quick way to identify the rollback. Therefore, the system cannot correct itself. The described ACC shut-off, where the rollback may exceed a tolerable rollback-acceleration, provides an improvement over prior-art systems. For uphill gradients, a brake until standstill leads to a final brake-to-stop without reacceleration being allowed, leads to a cancellation of the ACC at a non-zero speed, or leads to a system ramp-out that is slow enough for a driver to handle. Direction-confusion is avoided by allowing resumption of the ACC system above a defined speed. In some embodiments, a message in the instrumentation cluster in the vehicle cabin informs the driver when the ACC was cancelled because of the hill gradient being too steep.

FIG. 1 shows a schematic view of a vehicle 100. The vehicle 100 has four wheels 104A, 104B, 104C, and 104D. In some other embodiments, the vehicle 100 can have a different number of wheels. The wheels 104A, 104B, 104C, and 104D are connected to two axles 108A and 108B, as shown. The four wheels are monitored by a plurality of wheel speed sensors 112A, 112B, 112C, and 112D. The wheel speed sensors 112A, 112B, 112C, and 112D are coupled to an electronic processing unit ("ECU") 116 which includes an ACC 118. The vehicle 100 also includes other sensors such as a steering angle sensor 120, a longitudinal acceleration sensor 124, an engine torque sensor 136, a lateral acceleration sensor array 128, a body slip angle sensor 132, and an engine torque sensor 136.

It should also be noted that the sensed values can come directly or indirectly from the sensors such as the lateral acceleration sensor array 128 and the roll sensor array 138. The sensed values can be sent or delivered to the ECU 116 via other vehicle systems. These other vehicle systems can include, but are not limited to, an antilock braking controller, an electronic stability controller, a restraint electronics controller, and the like. It should also be noted that the sensed values can also be configured to be available at the ECU 116 using direct electrical connections from the sensors such as the lateral acceleration sensor array 128 and the roll sensor array 138, direct electrical connections to other vehicle systems, or via a vehicle communication bus (e.g., a CAN bus), in a known manner.

Figure 2:
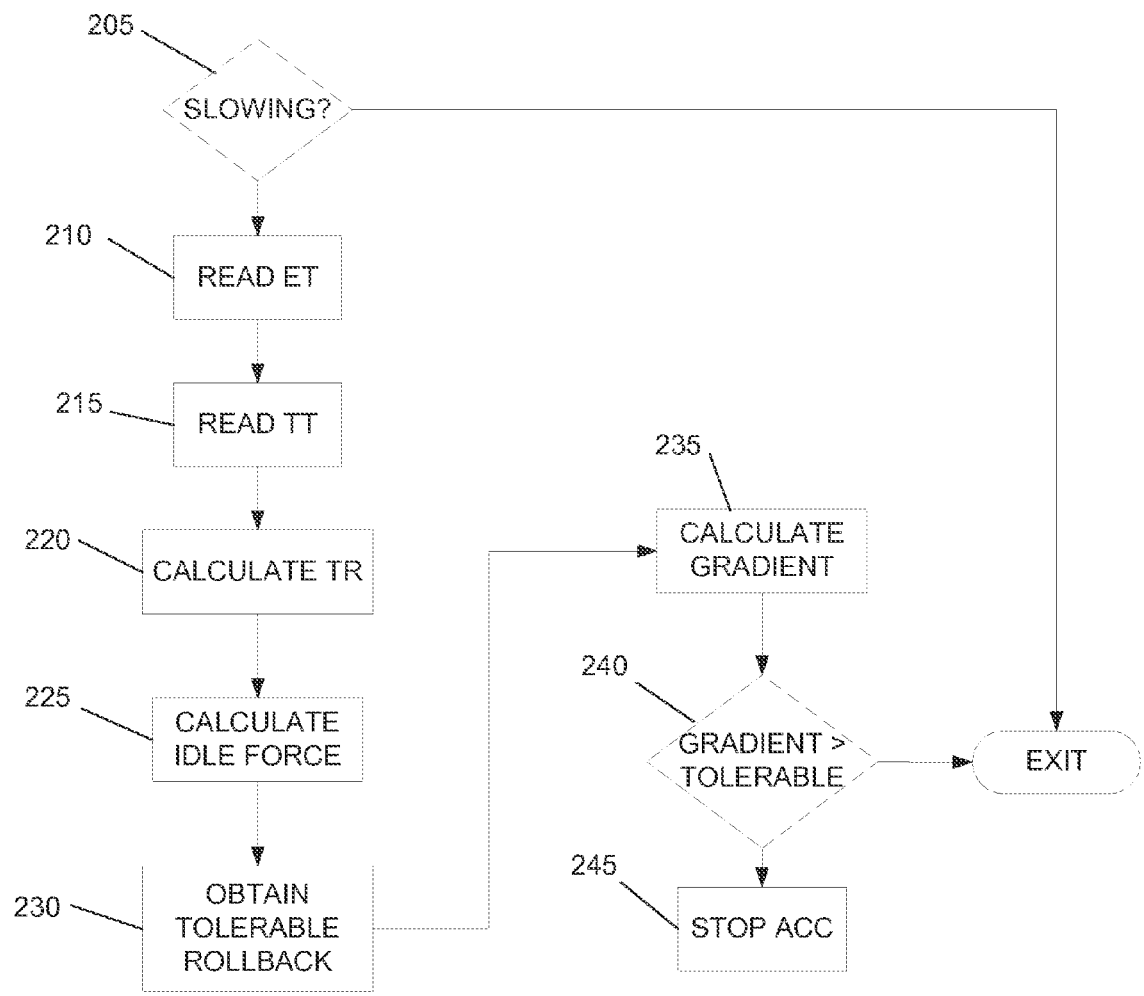
FIG. 2 is a flow chart of the operation of an embodiment of an ACC.

FIG. 2 is a flow chart of the operation of an embodiment of an ACC which automatically shuts off when coming to a stop on an incline having a gradient that is too steep. The ACC determines if the vehicle is slowing (step 205). If the vehicle is slowing, the ACC reads an engine torque (ET) (step 210). The ET is the torque produced by the engine during idle and can be obtained from a sensor or programmed into the ACC system. Next, the ACC reads a transmission torque ratio (TT) (step 215). The transmission torque ratio is the ratio of the torque generated by the transmission and can be obtained by from a sensor or programmed into the ACC system. The TT depends on what gear the transmission is in. Next, the ACC calculates or reads the radius of the tires (TR) (step 220). The ACC then calculates the idle force of the vehicle using equation 1 above (step 225). The ACC then obtains the tolerable rollback acceleration (e.g., from a memory) (step 230), and calculates the gradient of the road the vehicle is on using the vehicle speed and lateral acceleration, both of which are obtained from sensors (step 235). The ACC then compares the actual gradient to the maximum gradient (step 240). If the actual gradient is less than the maximum tolerable gradient, the ACC continues to function normally. However, if the actual gradient is steeper than the maximum tolerable gradient, the ACC shuts down (step 245) letting the driver take over control of the vehicle.

Thus, the invention provides, among other things, an ACC which shuts off when the vehicle is on an uphill gradient that is too steep.

What is claimed is:

1. A method of controlling an adaptive cruise control (ACC) system of a vehicle by a controller, the method comprising:
   determining, by the controller, a torque of an engine of the vehicle;
   determining, by the controller, a torque-ratio of a transmission of the vehicle;
   calculating, by the controller, an idle force of the vehicle from the torque of the engine and the torque-ration of the transmission;
   determining, by the controller, a maximum tolerable gradient using the formula:

$$F\_hill = F\_{idle+vehiclemass} * a\_tolerableRollback$$

where F_hill is the maximum tolerable gradient, F_idle is the idle force of the vehicle, vehiclemass is a mass of the vehicle and contents, and a_tolerableRollback is a maximum tolerable rollback acceleration;
   obtaining, by the controller, an actual gradient of a surface the vehicle is on; and
   turning off the adaptive cruise control when the actual gradient exceeds the maximum tolerable gradient.

2. The method of claim 1, wherein the vehiclemass is the Gross Combined Vehicle Weight (GCVW) for the vehicle.

3. The method of claim 1, wherein the idle force is calculated using the formula $$F\_idle = EngineTorque * transmissionTorqueRatio / Tireradius$$

where F—idle is the idle force, EngineTorque is the torque produced by the engine during idle, TransmissionTorqueRatio is the torque that is being converted by the transmission, and Tireradius is the radius of tires on the vehicle.

4. The method of claim 1, wherein the torque of the engine of the vehicle is detected by a sensor.

5. The method of claim 1, wherein the torque of the engine is a constant stored in a memory of the controller.

6. The method of claim 1, wherein the torque-ratio of the transmission of the vehicle is detected by a sensor.

7. The method of claim 1, wherein the torque-ratio of the transmission is a constant stored in a memory of the controller.

8. The method of claim 7, wherein the torque-ratio of the transmission is the constant based on a gear the transmission is in.

9. The method of claim 1, wherein the controller is an engine control unit (ECU).

10. The method of claim 1, wherein the actual gradient is calculated based on a difference between a speed of the vehicle and a sensed longitudinal acceleration.

11. A vehicle comprising:
an engine;
a transmission driven by the engine; and
an engine control unit (ECU) including an adaptive cruise control (ACC) and configured to:
determine a torque of the engine;
determine a torque-ratio of the transmission;
calculate an idle force of the vehicle from the torque of the engine and the torque-ratio of the transmission;
determine a maximum tolerable gradient using the formula:

$$F\_hill = F\_idle \div vehiclemass * a\_tolerableRollback$$

where F_hill is the maximum tolerable gradient, F_idle is the idle force of the vehicle, vehiclemass is a mass of the vehicle and contents, and a_tolerableRollback is a maximum tolerable rollback acceleration;
obtain an actual gradient of a surface the vehicle is on; and
turn off the ACC when the actual gradient exceeds the maximum tolerable gradient.

12. The vehicle of claim 11, further comprising an engine torque sensor configured to provide an indication of the engine torque to the ECU.

13. The vehicle of claim 11, further comprising a transmission torque-ratio sensor configured to provide an indication of the transmission torque-ratio to the ECU.

14. The vehicle of claim 11, further comprising a speed sensor configured to provide an indication of a speed of the vehicle to the ECU.

15. The vehicle of claim 11, further comprising a longitudinal acceleration sensor configured to provide an indication of a longitudinal acceleration of the vehicle to the ECU.

* * * * *